US009619825B1

(12) United States Patent
Albert et al.

(10) Patent No.: US 9,619,825 B1
(45) Date of Patent: Apr. 11, 2017

(54) MANAGEMENT OF DISTRIBUTION LISTS

(71) Applicant: Sprint Communications Company L.P., Overland Park, KS (US)

(72) Inventors: Alan A. Albert, Stilwell, KS (US); Bret R. Robideaux, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 256 days.

(21) Appl. No.: 14/602,096

(22) Filed: Jan. 21, 2015

(51) Int. Cl.
| | | |
|---|---|---|
| *G06F 15/16* | (2006.01) | |
| *G06Q 30/02* | (2012.01) | |
| *H04L 12/58* | (2006.01) | |
| *H04L 29/12* | (2006.01) | |
| *H04L 12/24* | (2006.01) | |
| *H04L 29/08* | (2006.01) | |

(52) U.S. Cl.
CPC ..... *G06Q 30/0269* (2013.01); *H04L 41/0654* (2013.01); *H04L 41/0668* (2013.01); *H04L 51/04* (2013.01); *H04L 61/1511* (2013.01); H04L 67/1065 (2013.01)

(58) Field of Classification Search
CPC ............. H04L 41/0654; H04L 41/0668; H04L 61/1511; H04L 67/1065
USPC ................. 709/220, 245, 230, 206
See application file for complete search history.

(56) References Cited

U.S. PATENT DOCUMENTS

| | | | | |
|---|---|---|---|---|
| 8,458,298 B2* | 6/2013 | Josefsberg | .......... | H04L 41/0654 709/220 |
| 2013/0111049 A1* | 5/2013 | Abu-Amara | ........ | H04L 61/1511 709/230 |

* cited by examiner

Primary Examiner — Kyung H Shin

(57) ABSTRACT

A method of providing advertisements using an email distribution list comprises generating a non-functional domain name list using a list of a plurality of email addresses that comprises a plurality of domain names, comparing each domain name of the plurality of domain names to each email address in the list of the plurality of email addresses, determining that one or more of the email addresses in the list of the plurality of email addresses comprise at least one domain name in the non-functional domain name list, marking each email address in the list of the plurality of email addresses that comprise the at least one domain name in the non-functional domain name list as non-functional, generating a message, selecting a first plurality of email addresses from the list of the plurality of email addresses, and sending the message to each email address of the first plurality of email addresses.

8 Claims, 7 Drawing Sheets

MANAGEMENT OF DISTRIBUTION LISTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that display advertisements financing that was not available before they displayed the advertisements. Advertisements can be provided to customers or potential customers through a variety of routes such as billboards, pop-up advertisements, direct mailings, through email, or any number of other routes. Presenting advertisements through any media allows wireless service providers to market to customers. Only a portion of the advertisements may result in revenues, and companies may seek to limit the costs of advertisements in order to improve their return on the advertisements provided to customers.

SUMMARY

In an embodiment, a method of managing an email list comprises determining, by a processor, a distribution of domain names within a list of email addresses. The list of email addresses comprises a plurality of domain names, and each domain name of the plurality of domain names are each associated with one or more email addresses. The distribution of domain names comprises a correlation between each domain name present in the list and a number of email addresses containing the respective domain name. The method also comprises selecting a first portion of the plurality of domain names based on the distribution, where a remaining portion of the plurality of domain names comprises a portion of the plurality of domain names that are not within the first portion, performing, by a processor, a domain name lookup on each domain name in the first portion of the plurality of domain names, determining that at least one domain name of the first portion of the plurality of domain names fails a domain name lookup, adding the at least one domain name that fails the domain name lookup to a non-functional domain name list, and generating, by a processor, an error expansion list using one or more domain names in the first portion of the plurality of domain names. The error expansion list comprises a plurality of error domain names that are based on the one or more domain names in the first portion of the plurality of domain names. The method also comprises correlating the domain names in the list with each of the error domain names in the error expansion list, determining that one or more of the domain names in the list match one or more of the error domain names, adding the one or more of the domain names in the list that match one or more of the error domain names to the non-functional domain name list, correlating the non-functional domain name list with the list of email addresses, determining that one or more of the email addresses in the list have domain names matching domain names on the non-functional domain name list, marking each of the one or more email addresses in the list that match the domain names on the non-functional domain name list as non-functional, and sending, by a server, an electronic message to one or more of the email addresses in the list that are not marked as non-functional, wherein the electronic message is received at an electronic device.

In an embodiment, a method of providing advertisements using an email distribution list comprises generating a non-functional domain name list using a list of a plurality of email addresses that comprises a plurality of domain names, comparing each domain name of the plurality of domain names to the domain name of each email address in the list of the plurality of email addresses, determining that one or more of the email addresses in the list of the plurality of email addresses comprise at least one domain name in the non-functional domain name list, marking each email address in the list of the plurality of email addresses that comprise the at least one domain name in the non-functional domain name list as non-functional, generating a message, selecting a first plurality of email addresses from the list of the plurality of email addresses, where each email address in the first plurality of email addresses is not marked non-functional; and sending the message to each email address of the first plurality of email addresses.

In an embodiment, a method of maintaining a functional email list comprises providing a non-functional domain name list that comprises a plurality of domain names, where one or more domain names of the plurality of domain names fails a domain name lookup, receiving, by a server comprising a processor, an email message comprising an origination address having an email message domain name, comparing the email message domain name with the plurality of domain names in the non-functional domain name list, determining that the email message domain name matches at least one of the domain names in the non-functional domain name list, removing the email message domain name from the non-functional domain name list, providing a plurality of destination email addresses, wherein each destination email address of the plurality of destination email addresses comprises a domain name, comparing each domain name of the plurality of destination email addresses with the plurality of domain names in the non-functional domain name list, and sending an outgoing email message to each email address of the plurality of destination email addresses that do not have domain names matching one or more domain names in the non-functional domain name list.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
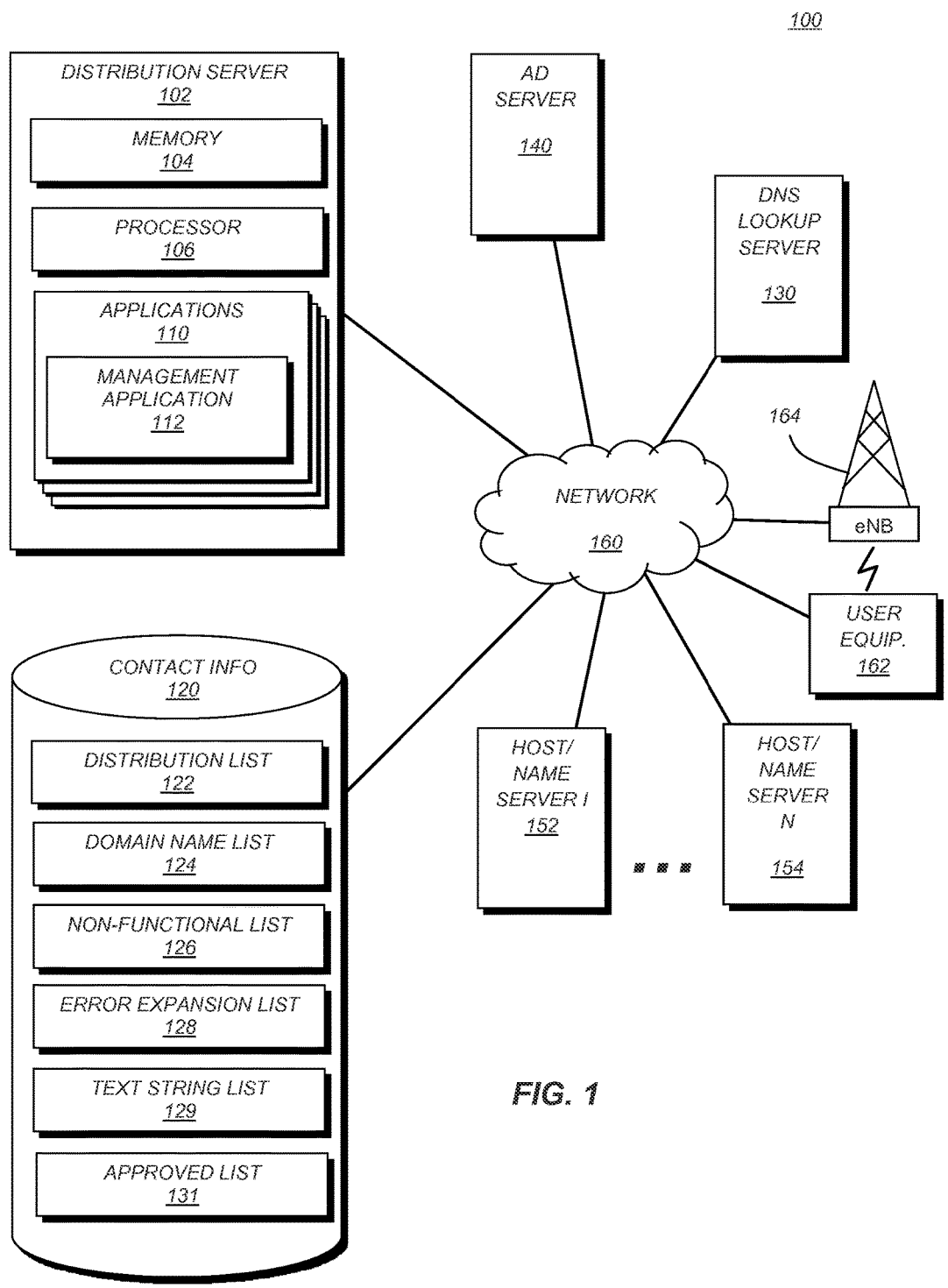
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication service providers and other companies with large customer bases may use distribution lists to communicate advertisements or other offers and information to the customers. For example, some wireless communication service providers can have customer bases numbering in the tens of millions. In general, the wireless communication service providers may use email distributors or sources to perform the actual distribution of the communications to the customers. These distributors receive a list of email addresses from the wireless communication service provider along with a desired communication and distribute the information to the email addresses.

The email addresses used for the distributions of the communications can be entered in a variety of ways. For example, a customer can dictate an email address to a customer care representative during a service call. In other cases, the customer may enter the information on user equipment, which may also be referred to as a mobile device or mobile electronic device in some contexts, with a relatively small typing surface. Errors in the email addresses can also occur simply due to inadvertent errors when entered in any other ways. In some instances, a customer may purposely provide a false email address, for example to avoid the perceived risk of receiving unwanted communications. The customers largely drive the entry of the information with little, if any, verification by the receiving provider. This may result in a number of errors within the entered email addresses that may not be detected before they are provided to the email distributors.

Mass distribution of information can inadvertently result in the sending of an email to an email address in a non-functional domain. A non-functional domain can be considered any domain name not having an entry in a domain name server and/or a domain name without a valid name server or servers. Spam filtering services have been established to detect these erroneous messages and provide this information to various internet service providers (ISPs). When more than a certain number of emails are sent to a non-functional domain, the spam filtering services may designate the source of the distribution as a spam source, which can result in the source being blocked from sending any additional email messages.

When an email source is blocked, all messages from the source can be prevented from passing through one or more internet service provider servers. As a result, being labeled a spammer or a spam source can result in significant lost revenue for the source as well as the wireless communication service providers whose emails cannot be sent out. The inability to send out the messages may continue until the source can demonstrate that they are not a spam source, which can be a lengthy process taking weeks or months.

In order to avoid being designated a spam source, the distribution lists used to communicate with customers can be analyzed to detect email addresses having potentially non-functional domain names. As disclosed herein, a combination of domain name lookups, typographic error expansions, and keyword comparisons can be used to try to identify potentially non-functional domain names in large distribution lists. As used herein, a "non-functional domain name" is a domain name that fails one or more of the filtering processes (e.g., fails a domain name lookup, is a likely typographical error, contains known error keywords, etc.) so that it has a risk of representing an incorrect email address. The resulting process can be implemented as an improved computer system and/or an improved email address parser and filter. Once filtered, the distribution list can be used to maintain the ability to send communications to customers at a reduced risk for triggering a spam trap.

As a first step, a domain name lookup may be performed to determine if the domain name is known to a domain name server (DNS). However, this method alone is not always successful as spam filter services can deliberately establish erroneous domain names in a domain name server in order to detect spam distributions. These false entries may be part of a set of "spam traps" intended to capture communications sent to incorrect email addresses as an indication of a spam source. So, a domain name associated with an email address in a distribution list may have a valid domain name lookup even though the email address is in a non-functional domain.

One or more additional functionality tests can be performed to verify the functionality of the domain names associated with the email addresses in the distribution list. In an embodiment, a portion of the domain names present in the email addresses can be selected as a trusted group of email addresses. For example, a selection of the domain names associated with a large number of the email addresses in a distribution list may be trusted since it is unlikely that a large number of email addresses would be associated with a non-functional domain name. The portion of the domain names having the greatest number of email addresses associated with them can then be used to determine a list of mangled domain names including typographical errors, misspellings, and the like. This list of mangled domain names can then be compared with the remaining domain names to determine which email addresses are associated with likely typographical errors of the set of trusted domain names. The resulting analysis may be used to identify which email addresses should not be included in the distribution of information.

A further test may be used alone or in combination with the previous tests and includes the use of key word or text string searching within the domain names including the hostnames of the mail exchange host serving the email domain as determined by the DNS lookup of the email domain. In some instances, spam filter services establish valid domain names including various key words such as "spam" to test the scrutiny of a distribution list. Further, some users may purposely or inadvertently include profane or obscene domain names that may run a risk of being a non-functional domain name. A list of text strings can be used to compare to the domain names and optionally, associated mail exchange host names. When a text string from the list matches or is contained within a domain name and optionally, associated mail exchange host names, the domain name may be marked as non-functional. In some cases, a text string may be acceptable if included in a larger text string. In this instance, using the shorter text string alone may result in a number of valid domain names being marked as non-functional. In order to limit the number of domain names falsely indicated as being non-functional, an allowed text string list may be generated. The allowed text strings can be compared with the domain names marked as non-functional based on the text string comparison. If the large text string is found, the domain name may be retained as a functional domain name.

The overall process may result in some domain names being considered non-functional when they may in fact be functional domain names. Some amount of false identification may be tolerated to avoid triggering a spam filtering service. However, if a customer actively seeks to be added to a distribution list, the domain name may be taken off of a non-functional domain name list. For example, a customer having an email address with a domain name marked as non-functional may send a message requesting to be included on a distribution list. The domain name associated with the email address may be compared to the non-functional domain name list, and if a match is found, the domain name may be removed from the domain name list. This may allow for the correction of falsely identified non-functional domain names. Further, the specific request for addition to the distribution list may mediate the risk that the domain name is a spam filter trap.

Turning now to FIG. 1, a distribution list management system 100 is described. In an embodiment, the system 100 comprises a distribution server 102, a contact information store 120, an advertisement server 140, a Domain Name System (DNS) lookup server 130, and one or more host or name servers 152, 154, each of which may be in communication with one or more other components of the system 100 through a network 160. In an embodiment, the system 100 may also comprise a Enhanced Node B (eNB) 164 and a user equipment 162. The system 100 may allow a distribution list including email addresses to be managed so that potentially invalid or non-functional email addresses may not be used in the distribution of information, which may potentially lead to being deemed a spam source and being blocked from sending emails.

The network 160 may be communicatively coupled to one or more of the components of the system 100. The network 160 may be a public communication network, a private communication network, or a combination thereof. In an embodiment, a wireless access point or other wireless local area network (WLAN) access point may provide a wireless link to the network 160 for one or more components of the system 100. A number of wireless communication protocols may be used including, but not limited to, WiFi, Bluetooth®, and the like.

The eNB 164 may be in communication with the network 160 and may provide a link between one or more user equipments 162 and the network 160. In an embodiment, the eNB 164 may provide a wireless communication link to the user equipment 162 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. The user equipment 162 may be capable of receiving an email associated with one or more of the addresses in the email list. The user equipment 162 can be in communication with the network 160 directly and/or through the eNB 164. In an embodiment, the user equipment 162 is one of a mobile phone, a laptop computer, a notebook computer, a tablet computer, a personal digital assistant, or a media player. In an embodiment, the user equipment 162 may be implemented as a handset.

The system 100 can be used to provide any type of information to a customer, user, third-party or the like. In an embodiment, the system 100 can be used to provide an advertisement or other marketing communication to a customer. In an embodiment, the advertisement may be provided by the advertisement server 140. The advertisement server 140 may pull one or more advertisements from an advertisement store and/or a third party advertisement provider and send the advertisement back to the distribution server 102 for use with one or more email addresses provided by the distribution server. In some embodiments, the email list may be provided to the ad server 140, which may then directly or indirect distribute the advertisement to one or more of the email addresses. For example, the ad server 140 may receive the email address list and forward the list along with an advertisement to an email distributor, who may then forward the advertisement to one or more of the emails in the email list. In an embodiment, the advertisement server 140 may pull information related to a particular subscriber from a profile data store so it can select ads from the advertisement data store that are relevant to the subject subscriber's interests.

The contact information store 120 may comprise various information related to one or more customers, users, third parties, or the like. In an embodiment, the contact information store 120 comprises a distribution list 122, a domain name list 124, a non-functional domain name list 126, an error expansion list 128, a text string list 129, and/or an approved list 131. The distribution list 122 may comprise the contact information for a plurality of customers or wireless communication service subscribers. The contact information can include information such as an email address, mailing address, customer name, phone number, and the like. In an embodiment, the distribution list 122 comprises a plurality of email addresses. The domain name list 124 comprises a list of each domain name present in the plurality of email addresses in the distribution list 122. The domain name list 124 may only comprise a single entry for each domain name present in the plurality of email addresses (e.g., duplicates may be removed). Since the domain name list 124 contains a list of each domain name, the domain name list 124 may be referred to as the overall domain name list in some contexts. Additional information such as the number of email addresses corresponding to each domain name may also be stored in the domain name list 124. The non-functional domain name list 126 may comprise a list of domain names that are considered non-functional. The non-functional domain name list 126 may serve as the basis for indicating which domain names in the plurality of email addresses should not receive communications. In some embodiments, the domain name list and/or the distribution list may be combined with the non-functional domain name list 126 while serving the purpose of identifying one or more non-functional domain names. For example, a domain name may be marked non-functional in the domain name list 124 using a flag or other indication.

The distribution server 102 may serve to process and screen a plurality of email addresses in a list to remove any potentially non-functional or invalid email addresses. In the interest of brevity, any email address indicated as being non-functional or invalid will be referred to as being "non-functional" herein. In some embodiments, some email addresses may be considered non-functional if they fail one or more screening procedures as described herein even though they may represent a valid, working email address.

The distribution server 102 may comprise a memory 104, a processor 106, and one or more applications 110, which may be stored in the memory 104 and configure the processor 106 to perform certain actions. The components of the server 102 are described in more detail herein. In an embodiment, the distribution server 102 may comprise a plurality of applications 110, including a management application 112. The management application 112 may be stored in the memory 104 and execute on the processor 106 to analyze a plurality of email addresses to identify any non-functional domains using one or more processes.

Figure 2:
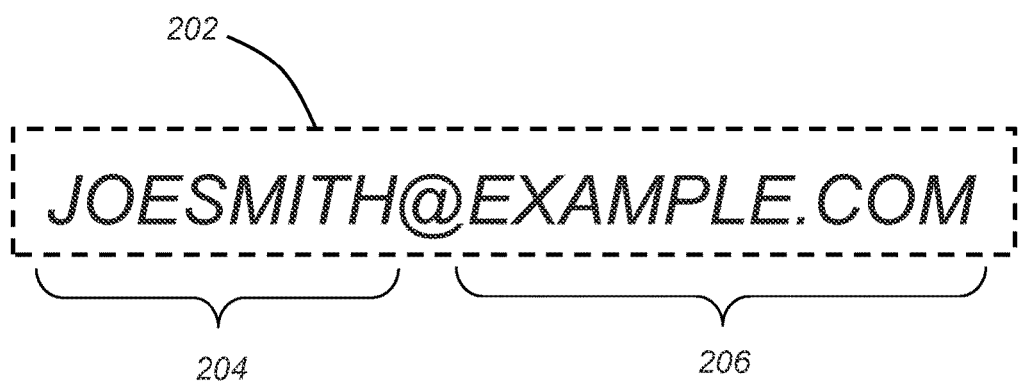
FIG. 2 is an exemplary email address useful in an embodiment.

As shown in the exemplary email address illustrated in FIG. 2, each email address 202 in the distribution list 122 may be represented by a username 204 or ID followed by a domain name 206. When used together, the entire email address allows an electronic message to be routed to the correct domain and then routed to the proper user account. The plurality of email addresses in the distribution list 122 may contain a plurality of domain names. The plurality of email addresses may be distributed across the plurality of domain names, with some domain names having a greater number of corresponding email addresses than other domain names.

In order to identify which domains may be non-functional, the management application 112 may first generate the domain name list 124 from the plurality of email addresses in the distribution list 122. Initially, each email address in the plurality of email addresses in the distribution list may be parsed to identify the domain name. The domain names may then be added to the domain name list. In some embodiments, the domain name list 124 may only contain a single entry for each domain name so that no duplicate domain names are present in the domain name list 124. In some embodiments, a count of the number of email addresses associated with each domain name may be stored in the domain name list 124 along with the domain names.

Once the domain name list 124 is generated, a number of verifications can be performed to identify which of the plurality of domain names, if any, could be considered non-functional. In an embodiment, a DNS lookup may be performed for each domain name in the domain name list 124. In some embodiments, the DNS lookup may only be performed for a portion of the domain names in the domain name list 124. In order to perform the DNS lookup of the domain names, the management application 112 may generate a DNS lookup request for each domain name and send the request to a DNS lookup server 130. When an entry exists in the DNS for the domain name, a message may be returned to the management application 112 indicating that the entry for the domain name exists in the DNS. Various search processes, including iterative and recursive name searching, can be carried out to determine if an entry exists for the domain name in one or more domain name servers. If a host or name server does not exist, the DNS lookup server 130 may return a message indicating that the domain name is not valid. When the management application 112 receives a notification that the domain name is not valid, the domain name may be added to the non-functional domain name list 126. In an embodiment, any domain name added to the non-functional domain name list 126 may be removed from the domain name list 124.

In some embodiments, a message may be generated to a host or name server 152, 154 to verify the existence of the domain name. For example, the management application 112 can generate a message to one or more of the host or name servers based on the response from the DNS lookup server 130 and attempt to communicate directly with the host or domain name server. A response may verify the existence of the server while a failure to receive a response may indicate that the domain name is non-functional.

An optional host name lookup may also be performed as part of the DNS lookup. When the DNS lookup request is sent to the DNS lookup server 130, the response may include information for one or more email exchange hosts such as the host name, the IP address of the host, and the like. Some domain name lookup responses may not contain an email exchange host name. When one or more email exchange host names are returned in the response, the email exchange host names can be used to search bad email exchange host names and eliminated those domain names associated with the email exchange host names.

In some embodiments, the domain names may be associated with a relatively small number of email exchange hosts. Some email exchange hosts serve as spam traps or filters that are used to detect spam emails. When a spam address is identified, a DNS lookup request can be performed on the domain name of the spam address to identify the email exchange host names of the hosts associated with domain names of the spam addresses. In some instances, the hosts names or IP addresses may be known. A list of known email exchange host names, IP addresses, or other identifying information can then be developed to identify email exchange hosts that should be avoided.

In a similar process to the one described above, an optional email exchange host verification can be performed. When the email exchange host information is returned in the DNS lookup response, the information can be extracted from the response and compared to the list of identified email exchange hosts that should be avoided. Various search processes, including iterative and recursive name searching, can be carried out to determine if an entry exists for the email exchange host in the list of identified spam email exchange hosts. When an email exchange host name returned for a domain name matches an email exchange host on the list of identified email exchange hosts, the domain name used in the initial DNS lookup can be added to the non-functional domain name list 126 and/or removed from the domain name list 124. This may prevent domain names that have valid domain name lookup responses but that are associated with spam filters as identified using the email exchange host from remaining on the list of valid email addresses.

In still other embodiments, an additional lookup for the IP address can be performed to verify the country code or regional code of the email exchange host. This information can be returned in a DNS lookup response and/or a separate lookup can be performed using a known IP address (e.g., an IP address returned as part of the DNS lookup) to perform an additional query. In general, regional internet registry databases contain the IP addresses associated with their region. There are currently five regions represented by regional registries including North America, South America, Africa, Europe/Northern Asia, and Asia/Australia. Each registry can be queried using the IP address to determine a country code and/or region. Any given email domain may be associated with multiple email exchange host IP addresses, which can result in multiple country codes/regions being associated with any domain name.

The country codes/regions can then be used to determine if a domain name should be considered a non-functional domain name. A regional address list of country codes and/or regional codes can be developed to identify potentially untrustworthy domain names or domain names associated with spam. The domain name can then be marked as non-functional when a regional code or country code matches a country code or regional code on the regional address list. When a domain name is associated with multiple domain names and/or regional codes, the domain name can be marked as non-functional based on being associated with any one regional code or country code matching a country code or regional code on the regional address list, or the domain name can be marked as non-functional based on being associated with any particular set of regional codes or country codes matching a set of country codes or regional codes on the regional address list.

Even when a domain name is verified in the DNS lookup server 130, the domain name may still be a non-functional domain name. In order to further verify the domain names in the domain name list, the domain names may be further reviewed to determine if any domain names correspond to typographical expansions of valid domain names. In some instances, a domain server may exist that corresponds to a mistyped domain name, but the domain name may be considered non-functional since it does not correspond to a correct email address in the distribution list.

The domain names in the domain name list 124, which may have any non-functional domain names that failed a DNS lookup removed, may be analyzed by the management application 112 to determine the number of email addresses in the distribution list 122 that correspond to each domain name. The domain names may then be ranked, by the management application 112, by the number of email addresses corresponding to each domain name. A top percentage of the domain names may be considered valid based on the frequency with which the domain name is used. The number of domain names selected for analysis may then be based on a threshold percentage of the number of domain names and/or the number of email addresses per domain name. For example, the top one percent, the top five percent, the top ten percent, etc. of the domain names may be selected for typographic analysis, where the domain names are ranked from the domain name having the highest number of corresponding email addresses down to the domain name having the lowest number of corresponding email addresses. As another example, the domain names corresponding to about the top 10 percent, about the top 20 percent, about the top 30 percent, about the top 40 percent, or about the top 50 percent of the number of email addresses may be selected for typographic analysis.

Once a top plurality of domain names are selected, the management application 112 may generate a plurality of typographic expansions and/or error text strings for each domain name and add the typographic expansions to an error expansion list 128, which may be stored in the contact information store 120. The error expansion list 128 may contain one or more typographical expansions and/or error text strings of each domain name in the top plurality of domain names. The typographical expansions and/or error text strings can include any type of error expansions including substituted character errors (e.g., swapped key errors, neighboring key errors, etc.), additional character errors (e.g., duplicate key errors, concurrent neighboring key errors, etc.), common misspellings, additional punctuation, missing character errors (e.g., omitted key errors, etc.), character order errors (e.g., reversed key errors, etc.), and the like. These types of errors may be referred to as mangled domain names in some contexts. Substituted character errors generally involve a misspelling of a word due to the presence of one or more characters in the word being substituted for an incorrect character. This may occur when the work is typed by incorrectly selected a wrong key and/or striking a neighboring key in place of the correct key. Similarly, additional character errors generally involve the addition of one or more characters at the beginning, end, and/or middle of a word. Duplicate key errors involve an additional character error when a key is selected more than an intended number of times. Concurrent neighboring key errors can occur when both a correct character and an incorrect character are pressed in a single key stroke. Additional punctuation errors can occur when additional non-alphanumeric characters are added to words. Common misspellings may take into account synonyms, homophones, and other similar sounding words that are commonly misspelled. Missing character errors can take into account partial words or text strings having one or more characters absent.

In an embodiment, the management application 112 may select a domain name from the top plurality of domain names and generate one or more typographical expansions and/or error text strings for the selected domain name. The one or more typographical expansions and/or error text strings can then be added to the error expansion list. When each domain name in the top plurality of domain names have had the one or more typographical expansions and/or error text strings generated and added to the error expansion list 128, the management application 112 may compare each entry in the error expansion list 128 to the remaining domain names in the domain name list 124. The comparison may not be performed for the top plurality of domain names. When a comparison of an entry in the error expansion list 128 matches a domain name in the domain name list 124, the domain name may be placed on the non-functional domain name list 126 by the management application 112. In an embodiment, the domain name may be removed from the domain name list 124 when the entry in the error expansion list 128 matches the domain name in the domain name list 124. The comparison process may proceed for each entry in the error expansion list 128. The comparison using the error expansion list 128 may aid in removing potentially mistyped contact emails from the distribution list 122.

In an embodiment, a text string search within the domain names may also be performed to identify potentially non-functional domain names. The management application 112 may be used to generate a plurality of text strings for comparison with the domain names. The text strings may comprise inappropriate words, obscenities, common spam filter terms (e.g., "spam," "filter," etc.), and the like. The text strings may generally be considered terms that have a risk of being non-functional or related to a spam filter organization.

The text strings may be entered into a text string list 129. When the text strings have been compiled, the management application 112 may compare each text string to each domain name in the domain name list 124. The domain name may be considered non-functional when the domain name matches the entire text string and/or when the text string is contained within any portion of the domain name. When a comparison of an entry in the text string list 129 matches a domain name in the domain name list 124, the domain name may be placed on the non-functional domain name list 126 by the management application 112. In an embodiment, the domain name may be removed from the domain name list 124 when the entry in the error expansion list 128 matches the domain name in the domain name list 124. The comparison process may proceed for each entry in the text string list 129.

In some embodiments, a threshold number of email addresses may be selected to provide an indication when a domain name matches or contains a text string entry in the test string list 129. For example, when a domain name containing a first text string is identified, the number of email addresses associated with the domain name may be compared to a threshold. If the number of email addresses associated with the domain name exceeds the threshold, a message may be generated that requests a manual check of the domain name. In some embodiments, the domain name may only be added to the non-functional domain name list when a reply is received by the management application 112 that the domain name is considered non-functional. This feature may serve to prevent a large number of email addresses from being removed from the distribution list in error.

In some embodiments, a text string may indicate a non-functional domain when contained within a domain name by itself, but may be acceptable in a larger text string. An allowable text string list may be created as a separate list or a component of the text string list 129. The allowable text string list may comprise one or more of the entries on the text string list 129 contained within a larger text string. The allowable text string list may be used to prevent a domain name from being placed on the non-functional domain name list during the comparison of the text strings with the domain names. For example, when a comparison of an entry in the text string list 129 with a domain name indicates that the text string is contained within the domain name, the management application 112 may further compare the domain name with the allowable text string list to determine if the domain name contains the text string in the larger allowable text string. If the domain name matches the allowable text string, the domain name may not be added to the non-functional domain name list, and the process may continue with the next entry in the text string list and/or the next domain name.

In some embodiments, an optional approved list 131 can be generated based on the verification processes. The approved list 131 can comprise one or more of the domain names that have been identified as passing the verification processes (e.g., as not being spam addresses). For example, the approved list may comprise one or more of the domain names from the domain name list 124 that are not marked as non-functional domain names within the non-functional domain name list 126. The approved list 131 can include all of the domain names in the domain name list 124 that are not identified as potential spam domain names. In some embodiments, the approved list may only contain a portion of the verified domain names from the domain name list 124. For example, the approved list 131 may include the domain names that have been verified using one or more of the verification processes described herein that correspond at least 90%, at least 95%, or at least 97% of the email addresses in the distribution list 122. The approved list 131 can then be used to generate a simplified verification procedure for sending one or more communications. For example, the verification procedures may be performed to generate the approved list 131, and the domain name of an email address may be compared to the entries in the approved list 131 to determine if the domain name is valid.

When the management application 112 executes, the resulting domain name list 124 may have any non-functional domain names marked and/or any non-functional domain names contained within the non-functional domain name list 126. When a request for sending an advertisement or other communication is received, the management application 112 may use the domain name list 124 and/or the non-functional domain name list 126 to generate a distribution list having any email addresses with non-functional domain names removed. In an embodiment, the management application 112 may use the non-functional domain name list 126 to compare the domain name entries to the distribution list 122. When a non-functional domain name entry on the non-functional domain name list 126 matches the domain name of an email address in the distribution list 122, the email address may be marked as non-functional, removed from the distribution list, have a flag set indicating that the address should not be used, or the like. The management application 112 may then prevent the email address having the non-functional domain name from being used in the distribution process. The email message and/or information may then be sent to each of the email addresses on the distribution list that do not contain non-functional domain names.

In some embodiments, the approved list 131 may be used when one or more messages are sent. When a request for sending an advertisement or other communication is received, the management application 112 may use the approved list 131 to generate an email list having only email addresses with domain names in the approved list 131. In an embodiment, the management application 112 may use the approved list 131 to compare the domain name entries to the distribution list 122. When a domain name of an email address does not match a domain name on the approved list 131, the email address may be marked as non-functional, removed from the distribution list, have a flag set indicating that the address should not be used, or the like. The management application 112 may then prevent the email address from being used in the distribution process. The email message and/or information may then be sent to each of the email addresses on the distribution list that have domain names on the approved list 131.

In some embodiments, one or more domain names may be marked as non-functional when the domain name represents a valid domain name. For example, an email address having a domain name of "gmile.com" may be considered a typographical error of "gmail.com" and marked as a non-functional domain when the domain "gmile.com" exists. As another example, the term "mile" may be contained in the text string list 129, and the domain "gmile.com" may be marked as non-functional based on the comparison of the terms in the text string list 129 to the domain name list 124 entries. In either instance, a customer having an email address at "user@gmile.com" may not receive any messages as part of a distribution event. In this embodiment, an active message may be received by the customer. Upon receiving a response to the active message from the customer, which may include a responding email message, a text message, a phone call, or the like, the customer response to the message may be used as an indication that the active message email domain name is valid. The management application 112 may then parse the domain name from the active message and compare the domain name to the entries in the non-functional domain name list 126. If the management application 112 finds that the domain name matches one or more entries in the non-functional domain name list 126, the domain name may be removed from the non-functional domain name list 126 and added to the domain name list 124. If the email address containing the domain name was removed or otherwise marked in the distribution list 122, the email address may be added back and/or marked as functional in the distribution list 122, thereby allowing future distribution messages to be sent to the email address.

Figure 3:
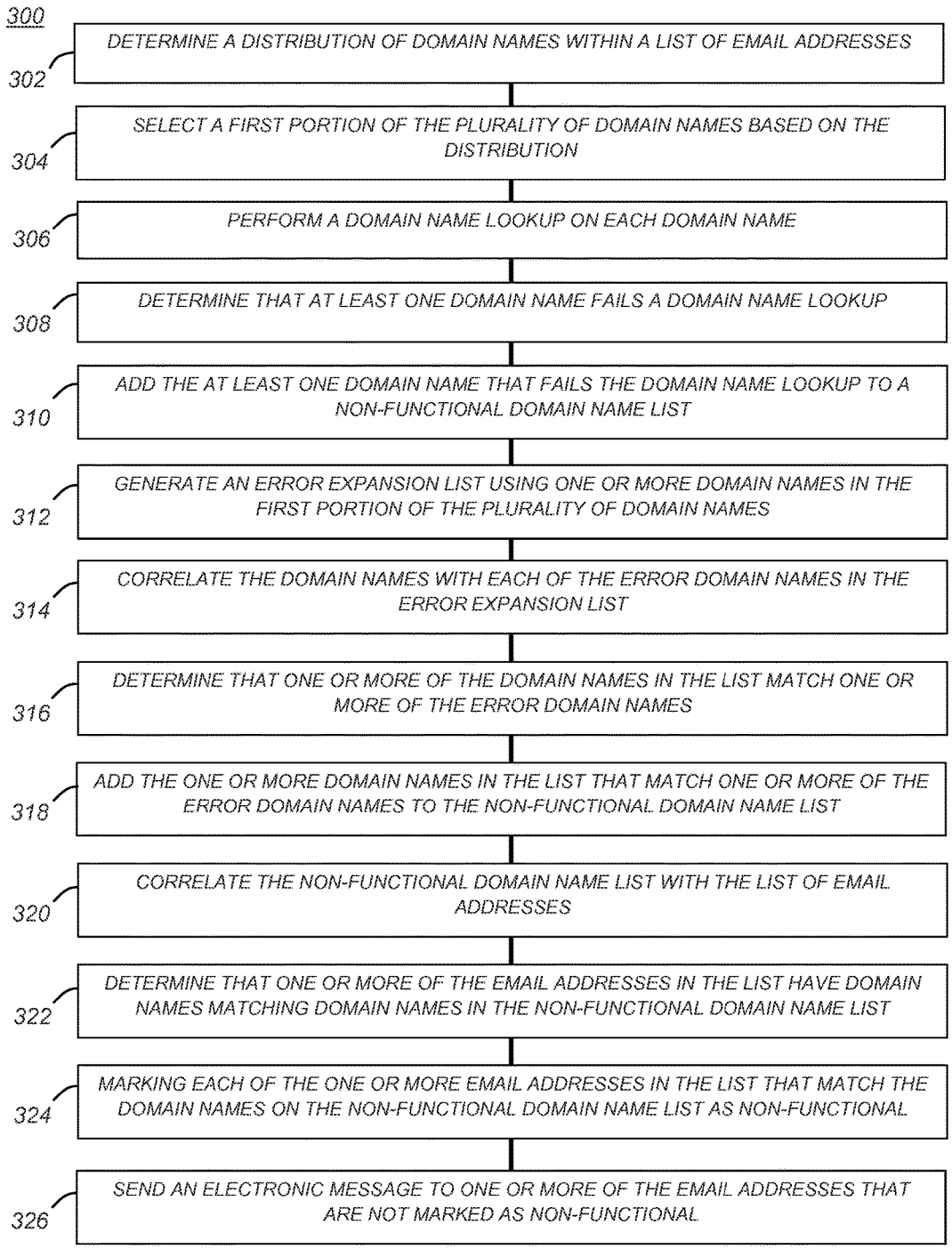
FIG. 3 illustrates a method of managing an email list according to an embodiment.

A method 300 of managing an email distribution list is shown in FIG. 3. The method 300 may be carried out using the system 100 of FIG. 1 or any other suitable system. A step 302, a distribution of domain names within a list of email addresses can be determined, for example, using a processor in a computer. The list of email addresses may comprise a plurality of domain names associated with one or more of the email addresses. The distribution of domain names may comprise a correlation between each domain name present in the list of email addresses and a number of email addresses containing the respective domain name.

At step 304, a first portion of the plurality of domain names may be selected based on the distribution of the domain names. The selection of the first portion of domain names may be based on a threshold number of email addresses corresponding to the domain names and/or a threshold number of domain names. In some embodiments, the first portion of the domain names may be based on a percentile of domain names or email addresses such as the top 10% of the greatest number of email addresses or domain names. A remaining portion of the plurality of domain names may comprise the portion of the plurality of domain names that are not within the first portion.

At step 306, a domain name lookup may be performed for each domain name in the first portion of the domain names. In some embodiments, a domain name lookup may be performed for each domain name. At step 308, at least one domain name may be determined to have failed the domain name lookup. The at least one domain name may then be added to a non-functional domain name list in response to the determination that the domain name fails the domain name lookup in step 310.

At step 312, an error expansion list may be generated using one or more of the domain names in the first portion of the domain names. The error expansion list may comprise any of the types of error expansions described herein. In an embodiment, the error expansion list may comprise one or more error domain names for each domain name in the first portion of the plurality of domain names. For example, the error domain names can comprise one or more substituted character errors, additional character errors, common misspellings, additional punctuation, missing character errors, character order errors, and/or any combination thereof for each of the domain names in the first portion of the plurality of domain names.

At step 314, the domain names in the remaining portion of the plurality of domain names can be correlated with each of the error domain names in the error expansion list. For example, each entry in the error expansion list can be compared with the domain names in the remaining portion of the plurality of domain names. At step 316, one or more of the domain names in the remaining portion of the plurality of domain names can be determined to match one or more of the error domain names in the error domain name list. When the one or more domain names match one or more of the error domain names, the one or more domain names that match the one or more error domain names can be added to the non-functional domain name list in step 318.

The list of email addresses can then be analyzed to create a distribution list of email addresses having only functional domain names. In step 320, the non-function domain name list can be correlated with the list of email addresses. In step 322, one or more of the email addresses in the list can be determined to have domain names matching domain names in the non-functional domain name list. Each of the one or more email addresses in the list that match the domain names on the non-functional domain name list can then be marked as non-functional and/or removed from the list in step 324. An electronic message can then be sent to one or more email addresses in the list that are not marked as non-functional in step 326. When the email addresses comprising non-functional domain names are removed from the list of emails, the electronic message can be sent to the one or more email addresses in the remaining list.

Various other additional and optional steps can be performed as part of the method 300. In an embodiment, the method 300 may also include using a text string list to determine if any domain names should be considered non-functional. In this process, a plurality of text strings can be determined and entered into a text string list. The plurality of text strings can be compared to the plurality of domain names. When one or more of the domain names in the plurality of domain names are determined to contain one or more of the plurality of text strings, the one or more domain names that contain one or more of the plurality of text strings can be added to the non-functional domain name list. In some embodiments, the text string comparison may only be carried out for the remaining portion of the plurality of domain names rather than all of the domain names in the plurality of domain names.

An additional optional process may perform an additional check after the text string comparison has taken place. In an embodiment, a text string results list comprises the one or more domain names in the remaining portion of the plurality of domain names containing the one or more of the plurality of text strings. The text string results list can be compared to an allowable text string list, which can contain a plurality of allowable text strings that each comprises one or more of the plurality of text strings. The plurality of allowable text strings can then be compared to each domain name in the text string results list. When one or more of the domain names in the text string results list are determined to contain one or more of the plurality of allowable text strings, the one or more of the domain names in the text string results list containing one or more of the plurality of allowable text strings can be removed from the text string results list. The remaining domain names on the text string results list can then be added to the non-functional domain name list.

In an embodiment, an approved list can be generated by correlating the domain names on the non-functional domain name list with the domain name list. Each non-functional domain name can be removed from the domain name list to generate the approved list. In some embodiments, the approved list may be further narrowed to include only a certain percentage of the email addresses in the distribution list. For example, the approved list may only contain the domain names that are not non-functional and that correspond to a top threshold of email addresses in the distribution list. The approved list may then be used to send one or more messages.

Figure 4:
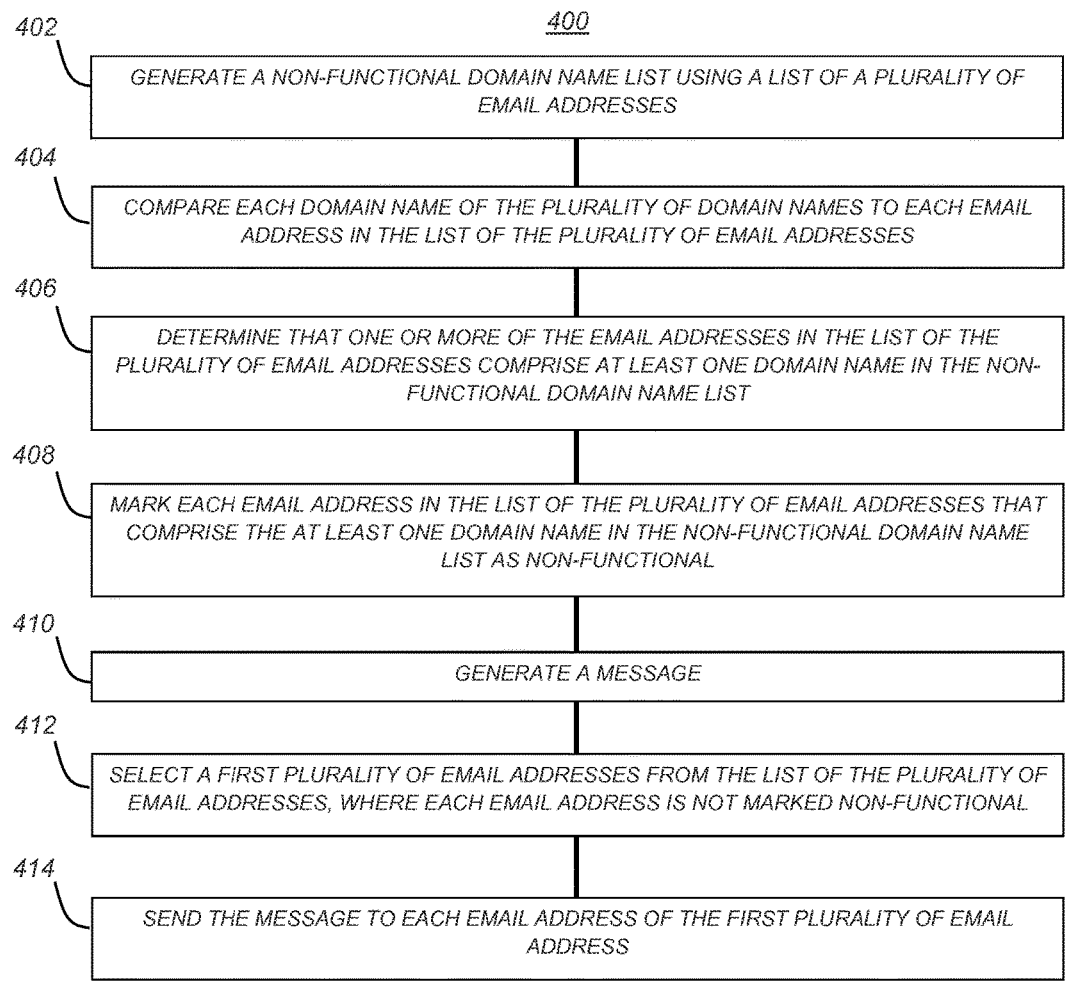
FIG. 4 illustrates a method of providing a message to a distribution list according to an embodiment.

Another method 400 of providing advertisements using an email distribution list is illustrated in FIG. 4. At step 402, a non-functional domain name list can be generated using a list of a plurality of email addresses. The non-functional domain name list can comprise a plurality of domain names. The non-functional domain name list can be generated using one or more of several available processes. In an embodiment, a domain name list comprising each domain name in each email address of the list of the plurality of email addresses can be generated. A distribution of domain names within the list of the plurality of email addresses can then be determined. The distribution of domain names can comprise a correlation between each domain name present in the list and a number of email addresses containing the respective domain name. A first portion of the plurality of domain names can be selected based on the distribution, and a domain name lookup can be performed on each domain name in the first portion of the plurality of domain names.

One or more of the domain names in the first portion of the plurality of domain names can be determined to have an active entry in a domain name server in response to performing the domain name lookup. The non-functional domain name list can then be generated comprising at least a portion of the domain names in the plurality of domain names that fail the domain name lookup.

In some embodiments, the non-functional domain name list can be generated using a list of a plurality of email addresses by first generating a domain name list comprising each domain name in each email address of the list of the plurality of email addresses. A first portion of the domain names in the domain name list can be selected, and an error expansion list can be generated using one or more domain names in the first portion of the domain names in the domain name list. The error expansion list can include a plurality of error domain names that are based on the one or more domain names in the first portion of the plurality of domain names. The domain names in the domain name list can be correlated with each of the error domain names in the error expansion list. When one or more of the domain names in the domain name list are determined to match one or more of the error domain names, the non-functional domain name list can be generated and can comprise the one or more domain names in the domain name list that match one or more of the error domain names from the domain name list.

In some embodiments, the non-functional domain name list can be generated using a list of the plurality of email addresses by first generating a domain name list comprising each domain name in each email address of the list of the plurality of email addresses. A first portion of the domain names in the domain name list can then be selected and an error expansion list can be generated using one or more domain names in the first portion of the domain names in the domain name list. The error expansion list can comprise a plurality of error domain names that are based on the one or more domain names in the first portion of the plurality of domain names. The domain names in the domain name list can be correlated with each of the error domain names in the error expansion list. One or more of the domain names in the domain name list can be determined to match one or more of the error domain names to create a text string results list. A plurality of allowable text strings can be determined. Each allowable text string of the plurality of text strings can comprise one or more of the plurality of text strings. The plurality of allowable text strings can be compared to each domain name in the text string results list. When it is determined that one or more of the domain names in the text string results list contain one or more of the plurality of allowable text strings, the one or more of the domain names in the text string results list containing one or more of the plurality of allowable text strings can be removed from the text string results list. The non-functional domain name list comprising the domain names in the text string results list can then be generated after removing the one or more of the domain names in the text string results list containing one or more of the plurality of allowable text strings.

Once the non-functional domain name list is generated in step 402, each domain name of the plurality of domain names can be compared to each email address in the list of the plurality of email addresses in step 404. In step 406, one or more of the email addresses in the list of the plurality of email addresses can be determined to comprise at least one domain name in the non-functional domain name list. Each email address in the list of the plurality of email addresses that comprise the at least one domain name in the non-functional domain name list can be marked as non-functional in step 408. In an embodiment, the email addresses can be marked as non-functional by setting a non-functional flag in the list of the plurality of email addresses. In step 410, a message can be generated. In some embodiments, the message can comprise an advertisement, an information message or the like that may be sent by email. In step 412, a first plurality of email addresses from the list of the plurality of email addresses can then be selected, where each email address in the first plurality of email addresses is not marked non-functional. In step 414, the message can then be sent to each email address of the first plurality of email addresses, and in some embodiments, the message can be received by one or more devices such as a user equipment, a computer, a server, or the like.

Figure 5:
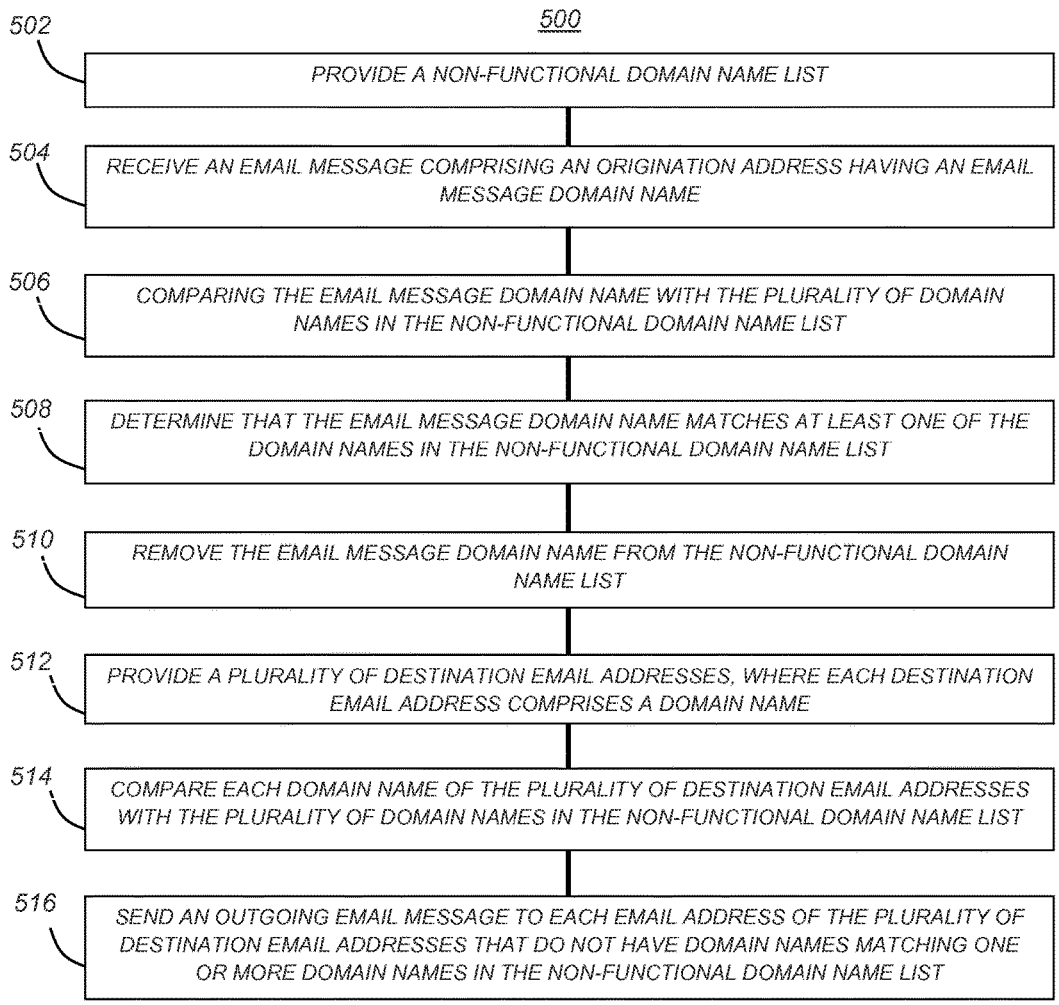
FIG. 5 illustrates a method of maintaining a functional distribution list according to an embodiment.

In an embodiment, a method 500 of maintaining a functional email list is illustrated in FIG. 5. The method 500 may begin by providing a non-functional domain name list in step 502. The non-functional domain name list may comprise a plurality of domain names, and one or more domain names of the plurality of domain names may fail a domain name lookup. The non-functional domain name list may also be provided based on one or more additional functionality tests. In an embodiment, providing the non-functional domain name list may also include generating an overall domain name list comprising each domain name in each email address of a list of a plurality of email addresses. A first portion of the overall domain names in the overall domain name list may be selected, and an error expansion list can be generated using one or more domain names in the first portion of the overall domain names. The error expansion list can comprise a plurality of error domain names that are based on the one or more domain names in the first portion of the overall domain names. The domain names in the overall domain name list can be correlated with each of the error domain names in the error expansion list. When it is determined that one or more of the overall domain names in the overall domain name list match one or more of the error domain names, the one or more domain names in the overall domain name list can be added to the non-functional domain name list.

In some embodiments, providing the non-functional domain name list may also include generating an overall domain name list comprising each domain name in each email address of a list of a plurality of email addresses. A plurality of text strings can be determined, and the plurality of text strings can be compared to each domain name in the overall domain name list. When it is determined that the one or more of the overall domain names contains one or more of the text strings of the plurality of text strings, the one or more of the overall domain names containing the one or more of the text strings can be added to the non-functional domain name list.

Once the non-functional domain name list is provided, an email message from a customer comprising an origination address having an email message domain name can be received in step 504. The email message domain name can be compared with the plurality of domain names in the non-functional domain name list in step 506. When it is determined that the email message domain name matches at least one of the domain names in the non-functional domain name list in step 508, the email message domain name can be removed from the non-functional domain name list in step 510. A plurality of destination email addresses can be provided in step 512. Each destination email address of the plurality of destination email addresses can comprise a domain name, and each domain name of the plurality of destination email addresses can be compared with the plurality of domain names in the non-functional domain name list in step 514. An outgoing email message can then be sent to each email address of the plurality of destination email addresses that do not have domain names matching one or more domain names in the non-functional domain name list in step 516.

Figure 6A:
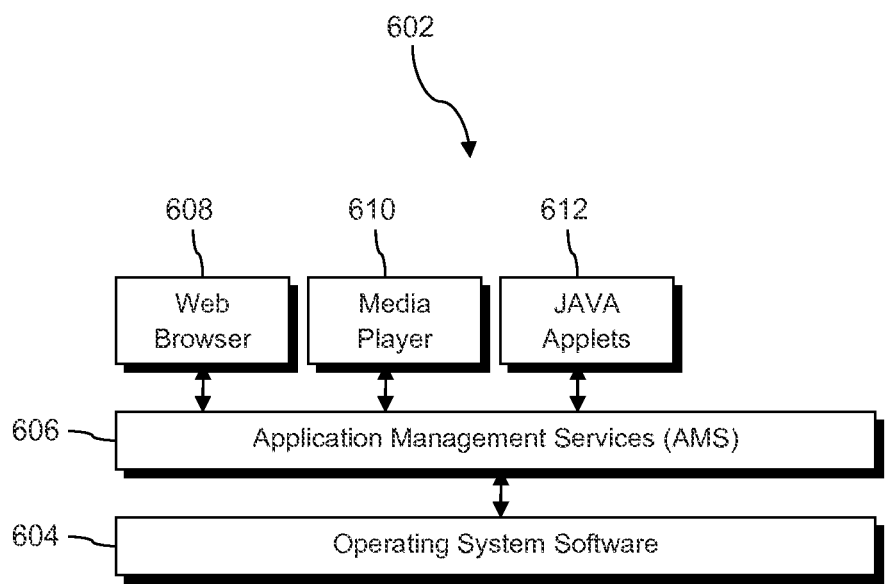
FIGS. 6A and 6B are block diagrams of software architecture according to an embodiment of the disclosure.

FIG. 6A illustrates a software environment 602 that may be implemented for use by a user equipment (e.g., a mobile communication device such as a mobile phone, a laptop computer, a personal digital assistant, a media player, a headset computer) or by a computer system (e.g., a server computer). The software environment 602 comprises operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on a computer. Also shown in FIG. 6A are a web browser application 608, a media player application 610, and JAVA applets 612. The web browser application 608 may be executed by the computer to browse content and/or the Internet, for example when a computer is coupled to a network via a wireless link. The web browser application 608 may permit a user to enter information into forms and select links to retrieve and view web pages. The media player application 610 may be executed by the computer to play audio or audiovisual media. The JAVA applets 612 may be executed by the computer to provide a variety of functionality including games, utilities, and other functionality.

Figure 6B:
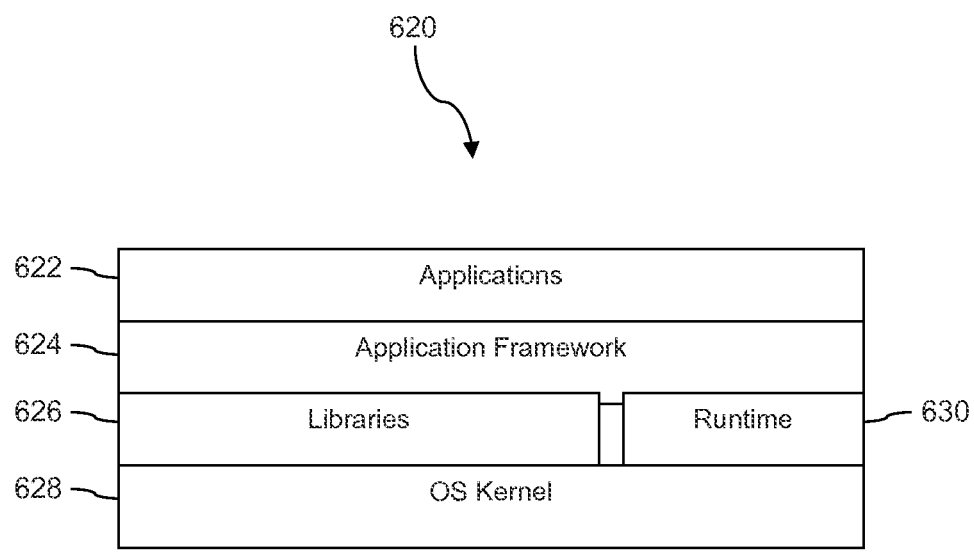

FIG. 6B illustrates an alternative software environment 620 that may be implemented for use by a user equipment (e.g., a mobile communication device such as a mobile phone, a laptop computer, a personal digital assistant, a media player, a headset computer) or by a computer system (e.g., a server computer). The software environment 620 comprises an operating system kernel (OS kernel) 628 and an execution runtime 630. The DSP 602 executes applications 622 that may execute in the execution runtime 630 and may rely upon services provided by the application framework 624. Applications 622 and the application framework 624 may rely upon functionality provided via the libraries 626.

Figure 7:
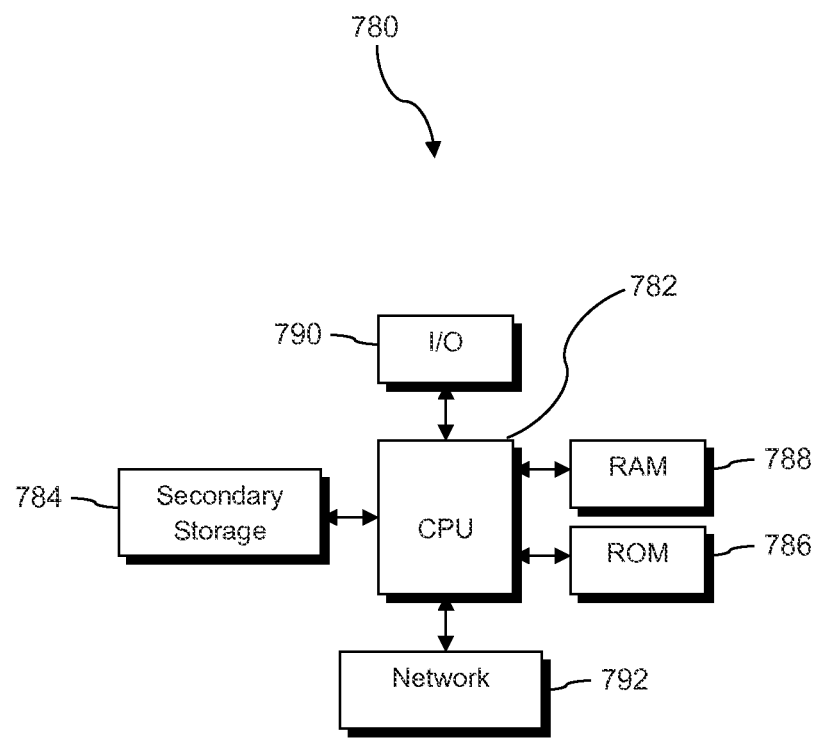
FIG. 7 illustrates an exemplary computer system suitable for implementing the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of identifying non-functional email addresses in an email list, the method comprising:

determining, by a processor, a distribution of domain names within a list of email addresses, wherein the list of email addresses comprises a plurality of domain names, wherein each domain name of the plurality of domain names are each associated with one or more email addresses, wherein the distribution of domain names comprises a correlation between each domain name present in the list and a number of email addresses containing the respective domain name;

selecting a first portion of the plurality of domain names based on the distribution, wherein a remaining portion of the plurality of domain names comprises a portion of the plurality of domain names that are not within the first portion;

sending, by a processor, a domain name lookup request to one or more domain name servers for each domain name in the first portion of the plurality of domain names;

determining that at least one domain name of the first portion of the plurality of domain names fails a domain name lookup based on sending the domain name lookup request;

adding the at least one domain name that fails the domain name lookup to a non-functional domain name list;

generating, by a processor, an error expansion list using one or more domain names in the first portion of the plurality of domain names, wherein the error expansion list comprises a plurality of error domain names that are based on at least one of typographical errors or misspellings of the one or more domain names in the first portion of the plurality of domain names;

comparing the domain names in the list with each of the error domain names in the error expansion list;

determining that one or more of the domain names in the list match one or more of the error domain names;

adding the one or more of the domain names in the list that match one or more of the error domain names to the non-functional domain name list;

comparing the non-functional domain name list with the list of email addresses;

determining that one or more of the email addresses in the list have domain names matching domain names on the non-functional domain name list;

marking each of the one or more email addresses in the list that match the domain names on the non-functional domain name list as non-functional; and sending, by a server, an electronic message to one or more of the email addresses in the list that are not marked as non-functional without triggering a spam filtering service, wherein the electronic message is received at an electronic device.

2. The method of claim 1, wherein comparing the domain names in the list with each of the error domain names in the error expansion list comprises comparing the domain names in the remaining portion of the plurality of domain names with each of the error domain names in the error expansion list.

3. The method of claim 1, wherein selecting a first portion of the plurality of domain names is based on a threshold of at least one of a number of email addresses in the list or a percentage of email addresses in the list.

4. The method of claim 1, further comprising:

determining that at least one domain name of the first portion of the plurality of domain names or the remaining portion of the plurality of domain names has an email exchange host name;

determining that the at least one domain name fails an email exchange host domain name lookup based on sending the domain name lookup request; and adding the at least one domain name that fails the email exchange host domain name lookup to the non-functional domain name list.

5. The method of claim 1, further comprising:

determining a plurality of text strings;

comparing the plurality of text strings to the domain names in the remaining portion of the plurality of domain names;

determining that one or more of the domain names in the plurality of domain names contain one or more of the plurality of text strings;

adding the one or more of the domain names that contain one or more of the plurality of text strings to the non-functional domain name list.

6. The method of claim 1, further comprising:

determining a plurality of text strings;

comparing the plurality of text strings to the domain names in the remaining portion of the plurality of domain names;

determining that one or more of the domain names in the remaining portion of the plurality of domain names contain one or more of the plurality of text strings, wherein a text string results list comprises the one or more of the domain names in the remaining portion of the plurality of domain names containing the one or more of the plurality of text strings;

determining a plurality of allowable text strings, wherein each allowable text string of the plurality of text strings comprise one or more of the plurality of text strings;

comparing the plurality of allowable text strings to each domain name in the text string results list;

determining that the one or more of the domain names in the text string results list contain one or more of the plurality of allowable text strings;

removing the one or more of the domain names in the text string results list containing one or more of the plurality of allowable text strings from the text string results list; and adding the domain names in the text strings results list to the non-functional domain name list after the removing.

7. The method of claim 1, further comprising:

determining that at least one domain name of the first portion of the plurality of domain names or the remaining portion of the plurality of domain names has an email exchange host name;

determining an IP address of an email exchange host using the email exchange host name;

determining at least one of a country code or region code associated with the IP address;

comparing the at least one of the country code or the region code with a list of disallowed country codes and region code; and determining that the at least one domain name is non-functional when the at least one of the country code or the region code matches an entry on the list of disallowed country codes and region codes; and adding the at least one domain name that matches an entry on the list of disallowed country codes and region codes to the non-functional domain name list.

8. The method of claim 1, wherein the error domain names comprise one or more additional character errors, common misspelling errors, additional punctuation errors, missing character errors, character order errors, and/or any combination thereof of one or more of the domain names in the first portion of the plurality of domain names.

* * * * *